(12) United States Patent
Butler (10) Patent No.: US 7,532,043 B1
(45) Date of Patent: May 12, 2009

(54) SIGNAL DETECTOR OUTPUT FOR CABLE DRIVER APPLICATIONS

(75) Inventor: Robert Karl Butler, Issaquah, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 33 days.

(21) Appl. No.: 11/925,515

(22) Filed: Oct. 26, 2007

(51) Int. Cl.
*H03K 17/00* (2006.01)
(52) U.S. Cl. .......................... 327/99; 327/293; 327/299
(58) Field of Classification Search .................. 327/99, 327/291, 293, 298, 299, 403, 407, 415
See application file for complete search history.

(56) References Cited

U.S. PATENT DOCUMENTS 6,411,135 B2 *  6/2002  Komoto ........................ 327/99
7,451,356 B2 *  11/2008  Yen et al. ....................... 714/43

* cited by examiner

*Primary Examiner*—Lincoln Donovan
*Assistant Examiner*—An T Luu
(74) *Attorney, Agent, or Firm*—Merchant & Gould, P.C.

(57) ABSTRACT

The present disclosure relates to a system, apparatus and method for a line driver circuit to generate a signal detect (SD) signal when an invalid data signal is detected at its input. An invalid signal may be present either when no signal is available or when the line driver circuit or another component in the system (e.g., a crosspoint switch, a multiplexer, etc.) fails. The SD signal is coupled to an external controller that can either power down the line driver circuit to save power when no signal is available, or change over to a different line driver circuit or other component of the system when a failure is identified. When the input signal is determined to be a valid data signal via the SD signal, the line driver circuit can be enabled for operation. The described systems, apparatus and methods can save the user from having to directly control the line driver power state, especially in systems with large router configurations that may include hundreds of line drivers.

15 Claims, 8 Drawing Sheets

SIGNAL DETECTOR OUTPUT FOR CABLE DRIVER APPLICATIONS

FIELD OF INVENTION

The present description relates to a system, method and apparatus for monitoring and testing the validity of an input signal to a line driver such as a cable line driver. More particularly, the present disclosure details that an output of a cable driver corresponds to a signal detector output, where a cable driver application can change to a different cable driver and/or a different crosspoint switch based on the detection of an invalid signal.

BACKGROUND

Recent advances in video broadcasting technology have lead to increased interest in high resolution displays. For example, high-definition television (HDTV) systems have significantly higher resolution than traditional standard definition (SD) broadcast formats such as the National Television System Committee (NTSC) format, the Sequential Color with Memory (SECAM) format, and the Phase Alternating Line (PAL) format. The HDTV format is available in a number of different display resolutions including 1280×720 pixels and 1920×1080 pixels with a large palette of colors.

The increased video resolution in HDTV is of no benefit unless the signals can be successfully transmitted and received by the television. Since high resolution signals require a large amount of data to be transmitted in a short period of time, increased transmission speeds and increased bandwidth requirements are imposed on the broadcasting system. Although a variety of compression technologies can be employed such as MPEG-2 to reduce the overall bandwidth requirements on the broadcast system, the compressed signals must still be transmitted and received with as little distortion as possible.

A typical broadcast system includes a video production and distribution center that multiplexes and transports video signals for reception by a subscriber via a set-top box. In video broadcast systems, a real-time switcher is needed so that local content such as commercials can be inserted into video programming. Line driver circuits are used to transmit the signals at high data rates (e.g., up to 3 Gbps) such as when HDTV signals are transmitted over 75 ohm transmission lines. The line driver circuits can be used in the broadcast system for routing and switching of the video signals, as well as in the distribution of the video signals.

DETAILED DESCRIPTION

Various embodiments will be described in detail with reference to the drawings, where like reference numerals represent like parts and assemblies throughout the several views. References to various embodiments do not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electromagnetic, mechanical, logical, or other connection between the items connected, without any electrical, mechanical, logical or other intermediary items. The term "coupled" can mean a direct connection between items, an indirect connection through one or more intermediaries, or communication between items in a manner that may not constitute a physical connection. The term "circuit" can mean a single component or a plurality of components, active and/or passive, discrete or integrated, that are coupled together to provide a desired function. The term "signal" can mean at least one current, voltage, charge, data or other such identifiable quantity including electrically coupled and magnetically coupled signals.

Briefly stated, the present disclosure relates to a system, apparatus and method for a line driver circuit to generate a signal detect (SD) signal when an invalid data signal is detected at its input. An invalid signal may be present either when no signal is available or when the line driver circuit or another component in the system (e.g., a crosspoint switch, a multiplexer, etc.) fails. The SD signal is coupled to an external controller that can either power down the line driver circuit to save power when no signal is available, or change over to a different line driver circuit or other component of the system when a failure is identified. When the input signal is determined to be a valid data signal via the SD signal, the line driver circuit can be enabled for operation. The described systems, apparatus and methods can save the user from having to directly control the line driver power state, especially in systems with large router configurations that may include hundreds of line drivers.

First Example Line Driver

Figure 1:
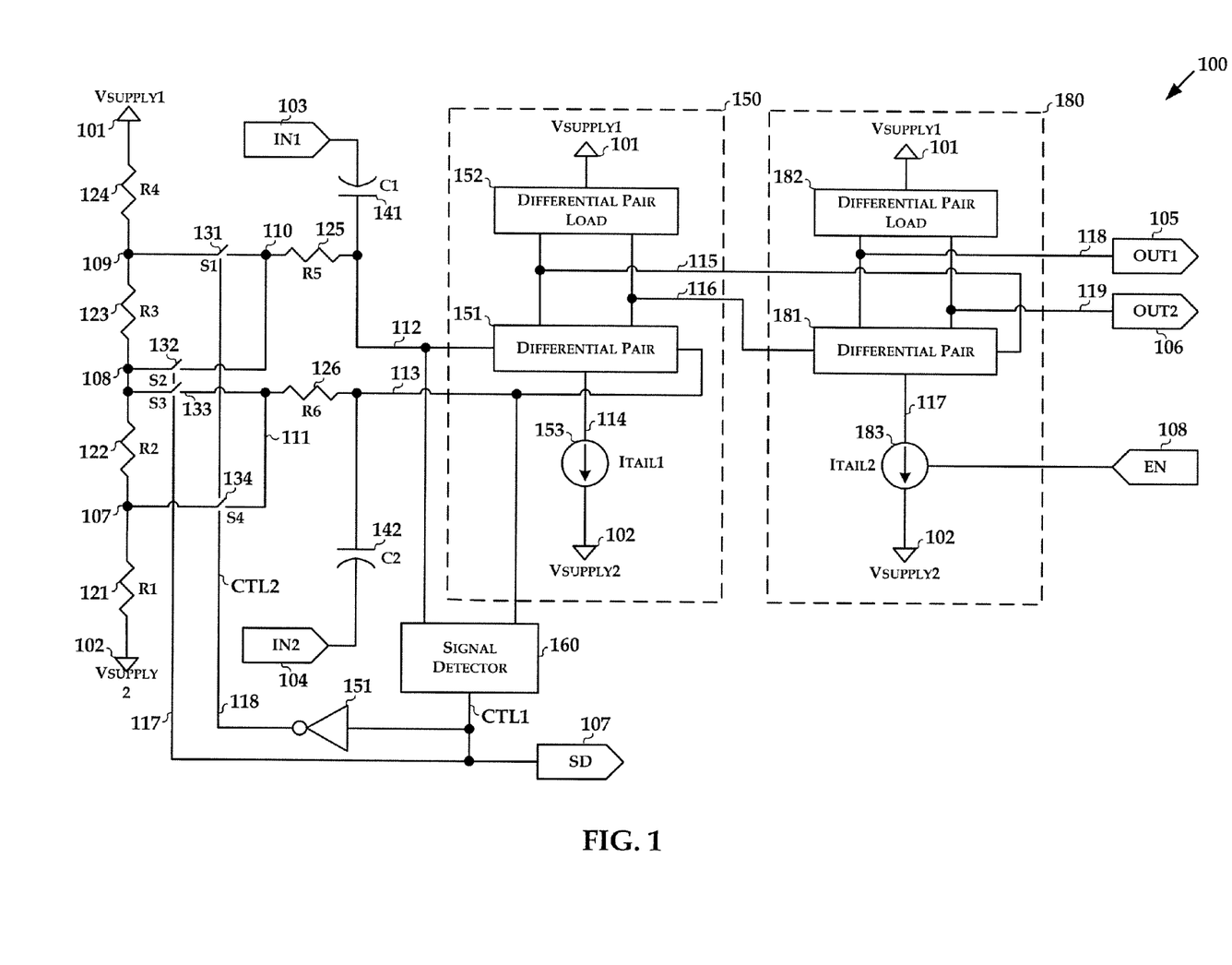
FIG. 1 is a schematic diagram that illustrates an example line driver circuit that employs an input signal detection scheme.

FIG. 1 is a schematic diagram that illustrates an example line driver circuit (140) that employs an input signal detection scheme arranged in accordance with at least some aspects of the present disclosure. Line driver circuit 100 includes six resistor circuits (121-126), four switching circuits (131-134), two capacitor circuits (141-142), an amplifier circuit (150), a signal detector circuit (160), an optional logic circuit (170), and another amplifier circuit (180).

Resistor circuit R1 (121) is coupled between nodes 107 and 102. Resistor circuit R2 (122) is coupled between nodes 108 and 107. Resistor circuit (R3) 123 is coupled between nodes 109 and 108. Resistor circuit R4 (124) is coupled between nodes 101 and 109. Resistor circuit R5 (125) is coupled between nodes 110 and 112. Resistor circuit R6 (126) is coupled between nodes 111 and 113. Switching circuit 131 (S1) is coupled between nodes 109 and 110, and includes a control terminal that is coupled to node 118. Switching circuit 132 (S2) is coupled between nodes 108 and 110, and includes a control terminal that is coupled to node 117. Switching circuit 133 (S3) is coupled between nodes 108 and 111, and includes a control terminal that is coupled to node 117. Switching circuit 134 (S4) is coupled between nodes 107 and 111, and includes a control terminal that is coupled to node 118. Capacitor circuit C1 (141) is coupled between nodes 103 and 112. Capacitor circuit C2 (142) is coupled between nodes 104 and 113. Amplifier circuit 150 includes a first input terminal that is coupled to node 112, a second input terminal that is coupled to node 113, a first output terminal that is coupled to node 105, and a second output terminal that is coupled to node 106. The signal detector circuit (160) includes a first input terminal that is coupled to node 112, a second input terminal that is coupled to node 113, and an output terminal that is coupled to node 117. Amplifier circuit 180 include a first input terminal that is coupled to node 115, a second input terminal that is coupled to node 116, a first output terminal that is coupled to node 118, and a second output terminal that is coupled to node 119.

The optional logic circuit (170), which in this example is illustrated as an inverter circuit, includes an input terminal that is coupled to node 117 and an output terminal that is coupled to node 118. Although depicted as a simple inverter circuit, the optional logic circuit (170) is not so limited and can thus be implemented as any appropriate logic function, including at least one member of the group comprising: a buffer, an inverter, a NAND logic gate, a NOR logic gate, an AND logic gate, an OR logic gate, an XOR logic gate, or an XNOR logic gate, to name a few examples.

Amplifier circuit 150 includes a differential pair (151), a differential pair load (152), and a current source (153). Differential pair 151 includes a first input terminal that is coupled to node 112, a second input terminal that is coupled to node 113, a first output terminal that is coupled to node 115, a second output terminal that is coupled to node 116, and a common terminal that is coupled to node 114. Differential pair load 152 includes a first input terminal that is coupled to node 115, a second input terminal that is coupled to node 116, and a power terminal that is coupled to node 101. Current source 153 includes an output terminal that is coupled to node 114, and a power terminal that is coupled to node 102.

Amplifier circuit 180 also includes a differential pair (181), a differential pair load (182), and a current source (183). Differential pair 181 includes a first input terminal that is coupled to node 115, a second input terminal that is coupled to node 116, a first output terminal that is coupled to node 118, a second output terminal that is coupled to node 119, and a common terminal that is coupled to node 117. Differential pair load 182 includes a first input terminal that is coupled to node 118, a second input terminal that is coupled to node 119, and a power terminal that is coupled to node 101. Current source 183 includes an output terminal that is coupled to node 117, and a power terminal that is coupled to node 102.

In operation, a first power supply voltage (VSupply1) is coupled to node 101, while a second power supply voltage (Vsupply2) is coupled to node 102, and a differential input signal (IN1, IN2) is applied across nodes 103 and 104. The differential input signal (IN1, IN2) is coupled to the input of the amplifier circuit at nodes 112 and 113 via capacitor circuits 141 and 142. The amplifier circuit (150) is arranged to generate a differential output signal at nodes 105 and 106 in response to the differential input signal (IN1, IN2) from nodes 112 and 113.

In one example, the amplifier circuit is arranged as a single stage amplifier circuit that includes a differential pair (151) that is arranged in cooperation with a differential pair load (152) and a current source (153) as depicted in FIG. 1. In such an example, nodes 105 and 106 of amplifier circuit 150 can simply be coupled to the output terminals OUT1 and OUT2, respectively. However, the amplifier circuit of FIG. 1 is merely one example and other amplifier circuits are also contemplated including multi-stage amplifiers that include cascade amplifier arrangements and/or cascode amplifier arrangements as may be desired. The output of the first stage (or input-stage) are coupled to nodes 105 and 106, which are then coupled to the remainder of the line driver data path through other blocks in the line driver, such as amplifier circuit 180, which can either be a second stage of the amplifier or an output stage of the amplifier. The circuit board that this cable driver is mounted upon has a parasitic coupling effect (see FIG. 5) from the output signal lines back to the differential inputs.

Amplifier circuit 180 includes a differential pair (181) a differential pair load (182), and a current source (183) that are arranged to operate in a substantially similar manner as that of amplifier circuit 150. The differential pair (181) is responsive to input signals from nodes 115 and 116 to generate an output signal across nodes 118 and 119. The differential pair load (182) of amplifier circuit 180 can be implemented internal to the amplifier, or may be implemented external to the amplifier such as terminating impedances for the line driver circuit. Current source 183 is depicted as including a control terminal that is coupled to an enable control input (108), which is arranged to selectively enable or disable the current source. When the current source is disabled, there is no conduction path through the various transistors between the supply terminals (e.g., 101, 102) so that energy is conserved. In some examples, a similar arrangement may be provided to current source 153 of amplifier circuit 150. It may be further desirable to force the output of the line driver circuit to a compliant level that is unchanging while the amplifier circuit or circuits are disabled. This may be accomplished by a passive pull-up and/or pull-down circuit and/or some other active circuit.

DC operating voltages for the inputs of amplifier circuit (150) can be generated by a voltage divider circuit that is formed by from resistor circuits 121-124, which are arranged as a resistor ladder-type voltage divider that is coupled between the power supply voltages Vsupply1 and Vsupply2. Tap-points in the voltage divider are formed at the junction between the resistor circuits (121-124), which are used to provide the DC operating voltages for the amplifier circuit (140). The DC operating voltages are illustrated as resistively coupled via resistor circuits 125 and 126 to each input terminal (112, 113) of the amplifier circuit (150), but such resistors (125, 126) can be eliminated in some implementations.

A first portion of the DC operating voltages are optionally coupled to node 112 through a first set of switching circuits (131, 132) via resistor circuit 125. A second portion of the DC operating voltages are optionally coupled to node 113 through a second set of switching circuits (133, 134) via resistor circuit 126. Switching circuits 131-134 are arranged to select the DC operating voltages for the amplifier circuit in response to signals CTL1 and optionally CTL2, which are generated by the signal detector circuit (160).

The signal detector circuit (160) is arranged to monitor the input terminals of the amplifier circuit (150) at nodes 112 and 113. The signal detector circuit (160) generates an output signal (CTL) at node 117 that is responsive to the input signals (IN1, IN2) from nodes 112 and 113. The input signals (IN1, IN2) are AC coupled through capacitor circuits C1 and C2, which superimposes the input signals (IN1, IN2) on the selected DC operating voltages. Also illustrated in FIG. 1, the signal detector signal (or SD signal) at node 117 can be coupled to an external pin (SD, 105) of the line driver for use by an external system controller (e.g., see FIG. 5).

When valid signals are detected by the signal detector circuit (160), one or more control signals (e.g., CTL1 and/or CTL2) are generated to activate switching circuits S2 and S3 and deactivate switching circuits S1 and S4. This in effect couples the DC voltage from the center of the resistive ladder circuit at node 108 to both input terminals (112, 113) of the amplifier circuit (150). When both input terminals of the amplifier circuit have the same DC operating voltage (or common mode voltage) there is no offset introduced into the input signal and the output of the line driver circuit will ideally have a symmetrical duty cycle.

When invalid signals are detected (e.g., no signal is present) by the signal detector circuit (160), the one or more control signals (e.g., CTL1 and/or CTL2) can be used to deactivate switching circuits S2 and S3 and to activate switching circuits S1 and S4. This in effect couples the DC voltage from node 109 to node 112, and the DC voltage from node 107 to node 113. Since the voltage at node 109 and 107 are not equal to one another, the input terminals of the amplifier circuit will have different DC operating voltage where an offset is introduced into the input signal. The offset can either be symmetrical about the voltage at node 108 or non-symmetrical depending on the effective resistance for resistor circuits 121-124. The introduced offset changes the operation of the amplifier circuit (150) so that a much larger noise signal is required to cause the differential pair to switch.

Figure 5:
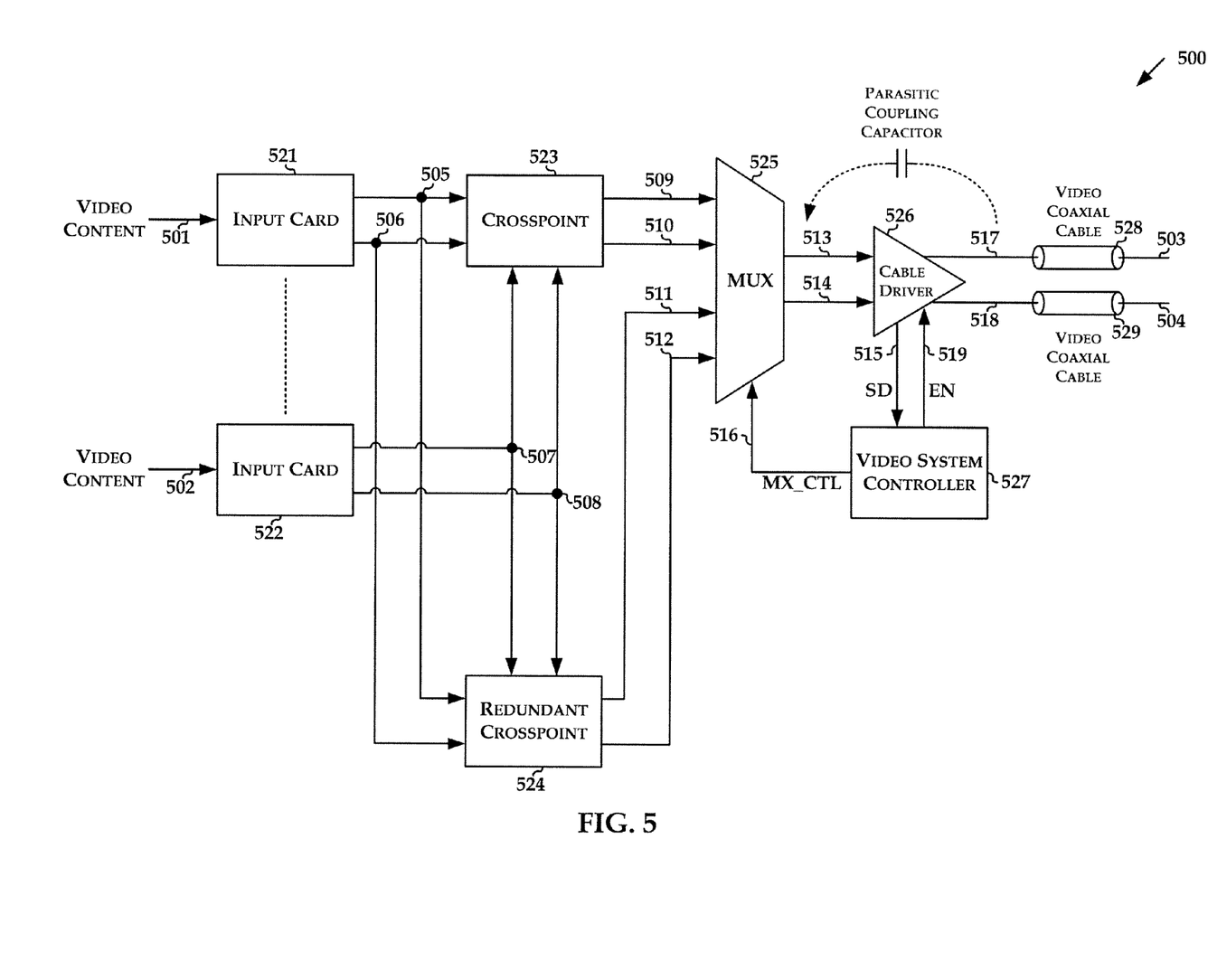
FIGS. 5-8 are schematic diagrams illustrating example line driver systems that employ one or more line driver circuits that each includes a signal detector output, all arranged in accordance with at least some aspects of the present disclosure circuit.

In some examples, the controller determines that no signal is present in the system (e.g., no video signal is present at any of the input cards 521-522 in FIG. 5) from the SD signal being de-asserted and the line driver is disabled by de-asserting an enable control line (EN, 106). The enable control line can be implemented as one control line for a single stage of the amplifier, as separate control lines for each stage of the amplifier, or in any other reasonable arrangement. In some examples, one or more of the current sources (e.g., 153 and 183) in a corresponding one of the amplifier stages is disabled so that power consumption is reduced. In still other examples, one or more current sources can be disabled while the output of the line driver circuit (100) is defined in a predictable operating state. For example, it may be desirable to have the output of the line driver circuit be in a predictable operating state when one or more amplifier stages are disabled. In such an example, a passive and/or active circuit (e.g., a pull-up circuit on line 118 and a pull-down circuit on line 119) can be used to define the output of the line driver when the amplifier is disabled.

Without the above-described dynamic offset adjustment to the input signal of the amplifier circuit, noise can be coupled into the inputs that may cause the output of the first stage amplifier circuit (e.g., 150) to fully switch even when no input signal is present. Increased gain to the undesired switching can then occur in the next stage of the amplifier circuit, which can then result in undesired switching of the output signal at the output of the line driver.

The use of a static offset voltage at the input of the amplifier circuit was explored in contemplation of the present disclosure. However, although a static offset will prevent self oscillation of the line driver, the static offset also introduces duty cycle distortion in the resulting output signal. At high data rates (e.g., MHz and greater switching speeds), the resulting duty cycle distortion is unacceptable. The described arrangement, which includes dynamic offset generation with the signal detector circuit (160), can be used to effectively allow the best of oscillation prevention without introducing duty cycle distortion at high data rates.

An additional benefit of improved system fault detection can also be realized through the placement of the signal detector circuit (160) at the input of the line driver circuit since the fault detection signal (e.g., the output of the signal detector circuit (160) can be used as a fault detection signal) can be provided to the system outside of the line driver itself. In some examples, the system (e.g., see FIG. 5) uses the controller (e.g., 527 of FIG. 5) to switch channels to another line driver where no valid signal is detected. For these examples, the system can infer that a fault condition has occurred when the SD signal is de-asserted and can disable the current line driver circuit and selecting another line driver circuit. In some other examples, the system can use the controller to simply disable the current line driver circuit when it is determined that no signal is expected so that power is conserved. In still other examples, the system can use the controller to switch in or out some other system component, as will be described later, when the system determines that the fault condition has occurred.

The depicted resistor ladder circuit formed by resistor circuits 121-124 works in conjunction with the switching circuits (131-134) to operate as an offset generator circuit. The offset generator circuit is responsive to the control signal or signals that are provided by the signal detector circuit (160). In some examples, an offset may be introduced at one node of the input terminals of the amplifier circuit (140), while in other examples offsets are introduced at both of the input terminals of the amplifier circuit (140). In some other examples (e.g., see FIG. 2), the offset is applied at the output of the amplifier circuit instead of at the input.

Although the above described circuits utilize a resistor ladder circuit topology to generate the DC operating voltages and offsets for the amplifier circuit (150), any other appropriate circuit topology may be used. In some examples, a DC voltage regulator can be used to generate at least one of the operating voltages such as via a series or shunt voltage regulator. The DC voltage regulator can either provide a multiplicity of output voltages, or a single output reference voltage that can then be divided into any necessary voltages by tap-points in a voltage divider circuit (e.g., a resistor ladder). In some other examples, a bandgap voltage reference or a vbe multiplier (base-emitter voltage multiplier) can be used to generate a reference voltage for the DC operating voltages. In some other examples, a voltage divider circuit can be implemented as a diode based divider circuit. In still other examples, a mixed resistor-diode ladder circuit may be used. The DC operating voltage may also be set external to the line driver circuit in some implementations. In some implementations, a voltage doubler can be used to generate the DC operating voltage for the inputs of the amplifier circuit (150). In some other implementation, a resistor can be coupled from Vsupply1 to a digital-to-analog converter (DAC) that can then be used to create the operating/offset voltages.

The various switching circuits may be implemented in any reasonable manner including transistor based switching circuits. In one example, a field effect transistor (FET) such as a metal-oxide semiconductor FET (MOSFET) or a junction FET (JFET) is configured to couple signals between the drain and source terminals in response to the application of a control signal at the gate terminal. The FETs can be implemented as N-type transistors (e.g., NMOS or N-JFET), P-type transistors (PMOS or P-JFET) or a complementary pair of transistors (e.g., CMOS) arranged as a transmission gate. Bipolar junction transistor (BJT) topologies are also contemplated in a similar manner.

The signal detector circuit (160) can be comprised of any variety of signal detection circuit that is capable of detecting the presence of a valid signal. In some examples, the signal detection circuit is comprised of an energy detection circuit. In some other examples, the signal detection circuit includes a filtering circuit such as a band-pass filter, a low pass filter or a high pass filter. In still other examples, the signal detection circuit may include a peak detection circuit. In still further examples, a combination of circuits is employed as a signal detector circuit including any one of: an energy detection circuit, a filter circuit, or a peak detector circuit.

Second Example Line Driver

Figure 2:
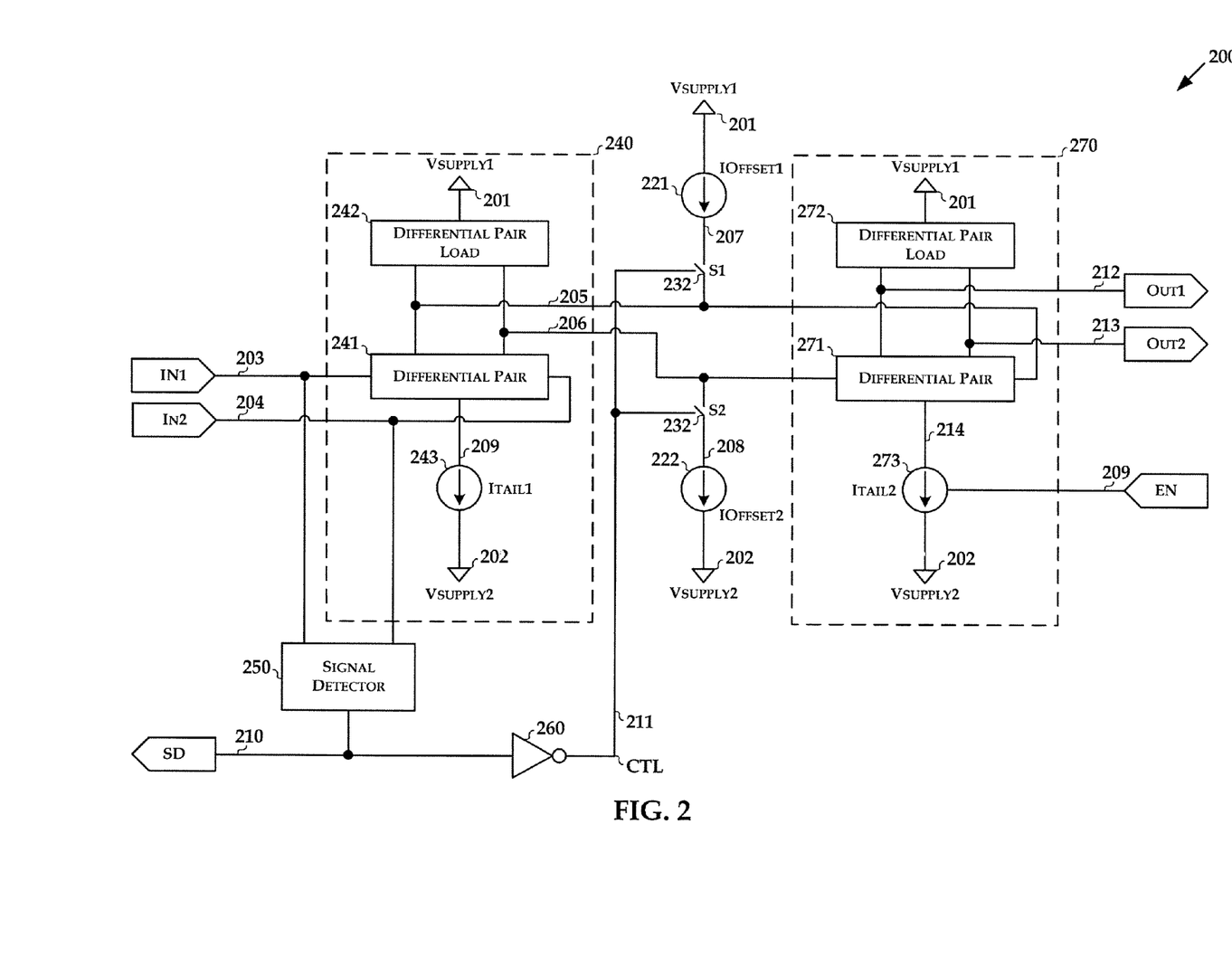
FIG. 2 is a schematic diagram that illustrates another example line driver circuit that employs an input signal detection scheme.

FIG. 2 is a schematic diagram that illustrates another example line driver circuit (200) that employs an input signal detection scheme arranged in accordance with at least some aspects of the present disclosure. Line driver circuit 200 includes two current source circuits (221, 222), two switching circuits (231, 232), an amplifier circuit (240), a signal detector circuit (250), an optional logic circuit (260), and another amplifier circuit (270).

Current source circuit 221 is coupled between nodes 201 and 207 and has an operating current that corresponds to IOffset1. Current source circuit 222 is coupled between nodes 208 and 202, and has an operating current that corresponds to IOffset2. Switching circuit 231 (S1) is coupled between nodes 207 and 205, and includes a control terminal that is coupled to node 211. Switching circuit 232 (S2) is coupled between nodes 206 and 208, and includes a control terminal that is coupled to node 211. Amplifier circuit 240 includes a first input terminal that is coupled to node 203, a second input terminal that is coupled to node 204, a first output terminal that is coupled to node 205, and a second output terminal that is coupled to node 206. Signal detector circuit 250 includes a first input terminal that is coupled to node 203, a second input terminal that is coupled to node 204, and an output terminal that is coupled to node 210. Amplifier circuit 270 includes a first input terminal that is coupled to node 205, a second input terminal that is coupled to node 206, a first output terminal that is coupled to node 212, and a second output terminal that is coupled to node 213.

The optional logic circuit (260), which in this example is illustrated as an inverter circuit, includes an input terminal that is coupled to node 210 and an output terminal that is coupled to node 211. Although depicted as a simple inverter circuit, the optional logic circuit (260) is not so limited and can thus be implemented as any appropriate logic function, including at least one member of the group comprising: a buffer, an inverter, a NAND logic gate, a NOR logic gate, an AND logic gate, an OR logic gate, an XOR logic gate, or an XNOR logic gate, to name a few examples. In some examples the optional logic circuit (260) may be eliminated.

Amplifier circuit 240 includes a differential pair (241), a differential pair load (242), and a current source (243). Differential pair 241 includes a first input terminal that is coupled to node 203, a second input terminal that is coupled to node 204, a first output terminal that is coupled to node 205, a second output terminal that is coupled to node 206, and a common terminal that is coupled to node 209. Differential pair load 242 includes a first input terminal that is coupled to node 205, a second input terminal that is coupled to node 206, and a power terminal that is coupled to node 201. Current source 243 is couple between nodes 209 and 202, and has an operating current that corresponds to Itail.

Amplifier circuit 270 also includes a differential pair (271), a differential pair load (272), and a current source (273). Differential pair 271 includes a first input terminal that is coupled to node 205, a second input terminal that is coupled to node 206, a first output terminal that is coupled to node 212, a second output terminal that is coupled to node 213, and a common terminal that is coupled to node 214. Differential pair load 272 includes a first input terminal that is coupled to node 212, a second input terminal that is coupled to node 213, and a power terminal that is coupled to node 201. Current source 273 includes an output terminal that is coupled to node 214, and a power terminal that is coupled to node 202.

In operation, a first power supply voltage (VSupply1) is coupled to node 201, while a second power supply voltage (Vsupply2) is coupled to node 202, and a differential input signal (IN1, IN2) is applied across nodes 203 and 204. The differential input signal (IN1, IN2) is coupled to the input of the amplifier circuit (240). The amplifier circuit (240) is arranged to generate a differential output signal at nodes 205 and 206 in response to the differential input signal (IN1, IN2) from nodes 203 and 204.

In one example, the amplifier circuit is arranged as a single stage amplifier circuit that includes a differential pair (241) that is arranged in cooperation with a differential pair load (242) and a current source (243) as depicted in FIG. 2. In such an example, nodes 205 and 206 of amplifier circuit 240 can simply be coupled to the output terminals OUT1 and OUT2, respectively. However, the amplifier circuit of FIG. 2 is merely one example and other amplifier circuits are also contemplated including multi-stage amplifiers that include cascade amplifier arrangements and/or cascode amplifier arrangements as may be desired. The output of the first stage (or input-stage) are coupled to nodes 205 and 206, which are then coupled to the remainder of the line driver data path through other blocks in the line driver, such as amplifier circuit 270, which can either be a second stage of the amplifier or an output stage of the amplifier. The circuit board that this cable driver is mounted upon has a parasitic coupling effect (see FIG. 5) from the output signal lines back to the differential inputs.

Amplifier circuit 270 includes a differential pair (271) a differential pair load (272), and a current source (273) that are arranged to operate in a substantially similar manner as that of amplifier circuit 240. The differential pair (271) is responsive to input signals from nodes 205 and 206 to generate an output signal across nodes 212 and 213. The differential pair load (272) of amplifier circuit 270 can be implemented internal to the amplifier, or may be implemented external to the amplifier such as terminating impedances for the line driver circuit. Current source 273 is depicted as including a control terminal that is coupled to an enable control input (209), which is arranged to selectively enable or disable the current source. When the current source is disabled, there is no conduction path through the various transistors between the supply terminals (e.g., 201, 202) so that energy is conserved. In some examples, a similar arrangement may be provided to current source 243 of amplifier circuit 240. It may be further desirable to force the output of the line driver circuit to a compliant level that is unchanging while the amplifier circuit or circuits are disabled. This may be accomplished by a passive pull-up and/or pull-down circuit and/or some other active circuit, substantially similar to the current source circuits (221, 222) illustrated in FIG. 2, where the control signal is responsive to the enable/disable controls provided at node 209.

Circuit 200 does not require AC coupling capacitors as was described in FIG. 1. Instead, the differential input signal (IN1, IN2) is directly coupled to the input of amplifier circuit 240 and to the input terminals of signal detector 250. However, circuit 200 will also work with AC coupled inputs in a similar arrangement as FIG. 1. Switching circuits S1 and S2 are arranged to be selectively activated and deactivated in response to a control signal (CTL) at node 211, or alternatively in response to an externally supplied control signal from node 209 via the enable/disable control terminal.

When a valid signal is present at the differential input (IN1, IN2) of the line driver circuit (200), the signal detector circuit (250) can be used to force switching circuits S1 and S2 into an open circuit position via control signal CTL at node 211. Current source circuits 221 and 222 have no effect on the output signal at nodes 205 and 206 when switching circuits S1 and S2 are in their open circuit position. Also illustrated in FIG. 2, the signal detector signal (or SD signal) at node 210 can be coupled to an external pin (SD) of the line driver for use by an external system controller (e.g., see FIG. 5).

If the signal detector does not detect a valid signal (i.e., an invalid signal is present or no signal is present) at nodes 203 and 204, then signal detector circuit 250 can be used to force switching circuits S1 and S2 into a closed circuit position via control signal CTL at node 211. Activation of switching circuits S1 and S2 forces an offset into the output of the amplifier circuit (240). The current (IOffset1) from current source 221 will force the voltage at node 205 (OUT1) to increase in value (sometimes referred to as "pulling up"). The current (IOffset2) from current source 222 will force the voltage at node 206 to decrease in value (sometimes referred to as "pulling down").

The offset generated by current sources 221 and 222 at nodes 205 and 206 via switching circuits 231 and 232 are determined independent from the input signal. Valid signals applied at nodes 203 and 204 are relatively large when compared to noise. When a small noise signal (e.g., an invalid signal) is present at nodes 203 and 204, the noise signal will not be large enough when gained up by the amplifier circuit (240) to allow the output to switch, effectively blocking the noise signal from effecting the output.

The current levels IOffset1 and IOffset2, which are generated by current source circuits 221 and 222, can either be small or large depending upon the desired effect. In one example, a small current is utilized by the current source circuits (221 and 222) to allow a large enough input signal to pass through. In another example, a larger current can be utilized to block all input signals so that the entire line driver is "muted".

The current source circuits 221 and 222 can be replaced by voltage sources in some implementations so that the voltage at nodes 205 and 206 are coupled to the voltage sources. The voltage sources can be regulated voltage sources, or programmable voltage sources such as via a DAC circuit. In some other implementations the current levels (IOffset1 and IOffset2) are programmable such as via a current DAC. In still some other implementations, current source circuit 222 can be coupled to node 205 and current source circuit 221 can be coupled to node 206 so that the applied offset currents are applied in an opposite direction to that illustrated in FIG. 2. In still other examples, only one current is applied to one of the nodes (e.g., 205 or 206) with a single current source circuit (e.g., 221 or 222). In still other examples, only a single voltage source is coupled to one of the output nodes (either 205 or 206) to force one output node to a desired voltage level. In still further examples, any of the above-described implementations may be applied to nodes 212 and 213 at the output of amplifier 270. In still additional examples, any of the above-described implementation may be arranged to be responsive to the enable/disable control signal (EN) received at node 209 by an eternal controller (not shown, see FIG. 5 for example).

Example Timing Diagram

Figure 3:
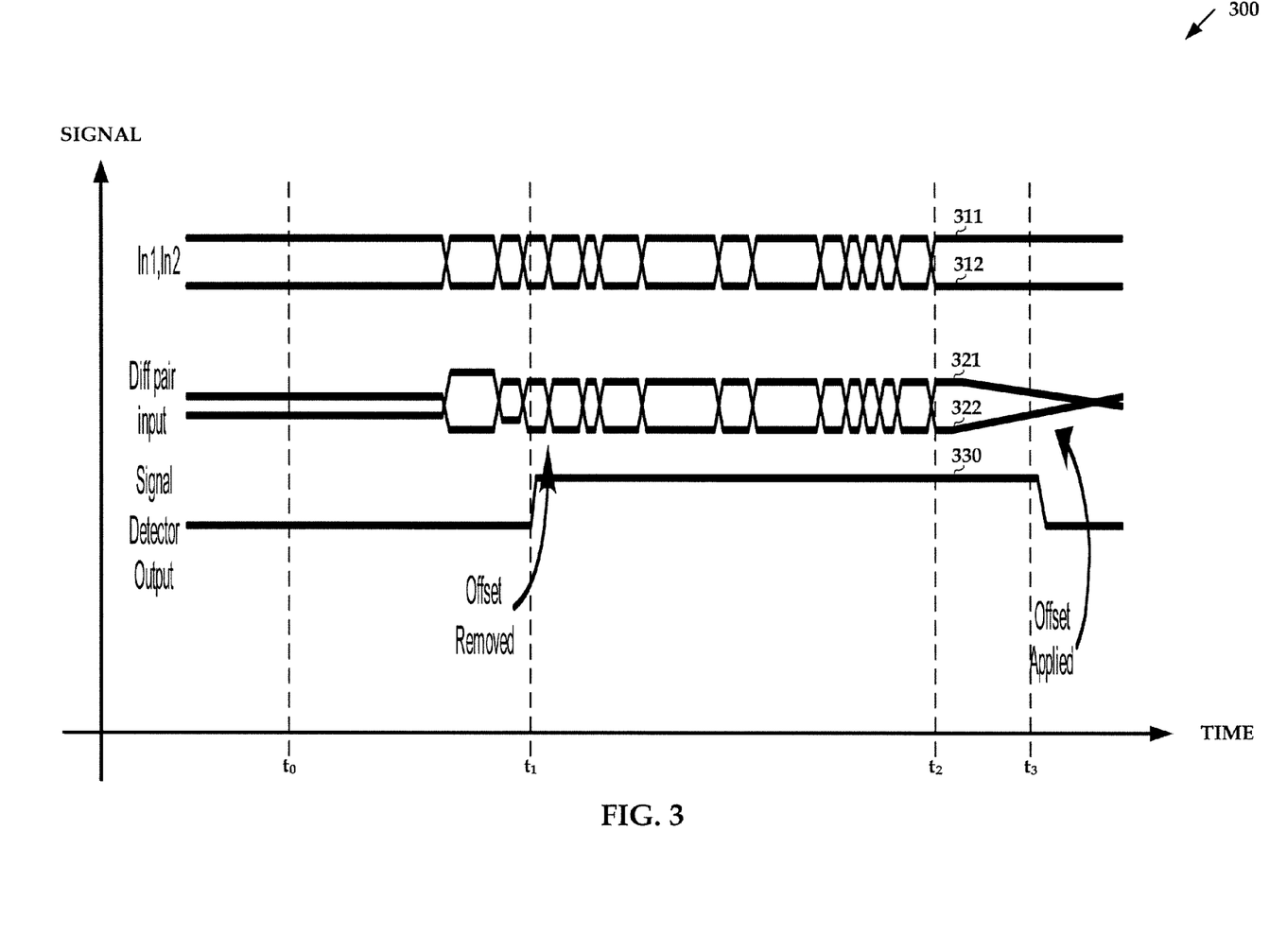
FIG. 3 is an illustration of an example timing diagram for the operation of a line driver circuit.

FIG. 3 is an illustration of an example timing diagram (300) for the operation of a line driver circuit that is arranged in accordance with at least some aspects of the present disclosure.

Timing diagram 300 illustrates a differential input signal (311, 312), a differential pair input signal (321, 322), and a detector output signal (330). From times $t_0$ through $t_1$ the detector signal output (330) is low indicating that an offset is being applied to the differential pair input signals (321, 322) when compared to the differential input signal (311, 312). At time $t_1$ the offset is removed from the differential pair input signal since a valid signal is detected at the input of the amplifier circuit (e.g., see FIG. 1). A valid signal continues between times $t_1$ and $t_2$. At time t2, the input signal ceases to toggle between values, indicating that the valid input is no longer available. Between times t2 and t3, the values associated with the deferential pair input signal (321, 322) begin to drift. At time t3, the signal detector circuit determines that no valid signal is present at the input of the amplifier circuit and an offset is again applied to the differential pair input signal (321, 322).

Example Signal Detector Circuits

Figure 4:
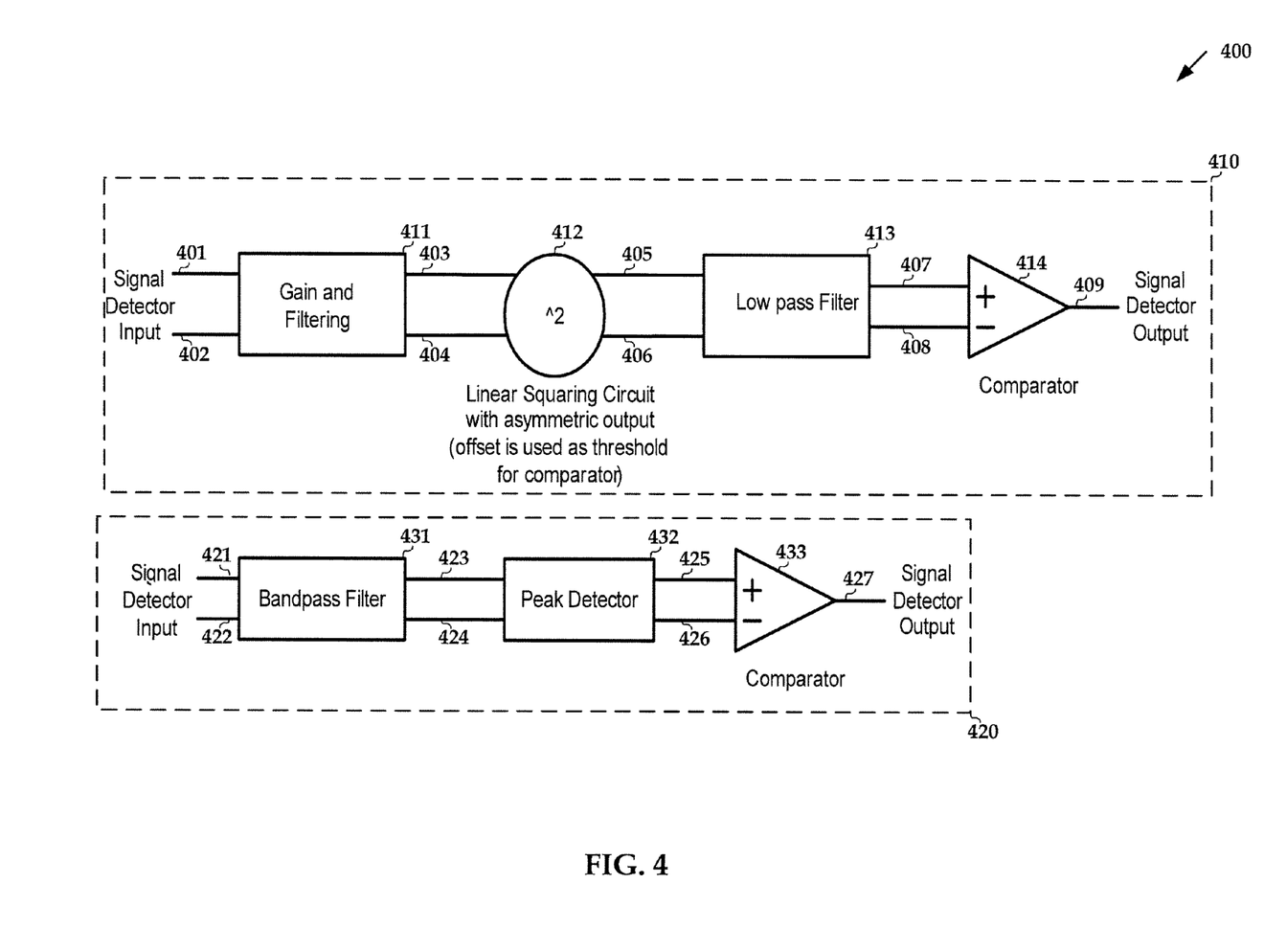
FIG. 4 is a schematic diagram illustrating example signal detector circuits.

FIG. 4 is a schematic diagram (400) illustrating example signal detector circuits that are arranged in accordance with at least some aspects of the present disclosure.

A first signal detector circuit (410) includes a gain and filtering circuit (411), a linear squaring circuit (412), a low pass filter circuit (413), and a comparator circuit (414). The gain and filtering circuit (411) includes a first input terminal coupled to node 401, a second input terminal coupled to node 402, a first output terminal coupled to node 403, and a second output terminal coupled to node 404. The linear squaring circuit (412) includes a first input terminal coupled to node 403, a second input terminal coupled to node 404, a first output terminal coupled to node 405, and a second output terminal coupled to node 406. The low pass filter circuit (413) includes a first input terminal coupled to node 405, a second input terminal coupled to node 406, a first output terminal coupled to node 407, and a second output terminal coupled to node 408. The comparator circuit (414) includes a non-inverting input terminal coupled to node 407, an inverting input terminal coupled to node 408, and an output terminal coupled top node 409.

An input signal is applied across nodes 401 and 402 as a signal detector input. The gain and filtering circuit (411) is arranged to increase the signal levels and optionally filter a portion of the frequency spectrum associated with the input signal, which is then provided as an input to the linear squaring circuit (412). The linear squaring circuit (412) is arranged to provide an asymmetrical output that corresponds to a square of the signal from nodes 403 relative to node 404. The low pass filter circuit (413) is arranged to generate an output signal at nodes 407 and 408 that is a filtered version of the signal from nodes 405 and 406 so that high frequency signals are ignored. The comparator circuit (414) is arranged to evaluate the output of the low pass filter circuit (413) and generate the signal detector output signal based on the difference between the voltages at nodes 407 and 408. The offset that is generated by the linear squaring circuit (412) is used by the comparator circuit (414) as threshold trip point for the signal detector output signal.

A second signal detector circuit (420) includes a bandpass filter circuit (431), a peak detector circuit (432), and a comparator circuit (433). The bandpass filter circuit (431) includes a first input terminal coupled to node 421, a second input terminal coupled to node 422, a first output terminal coupled to node 423, and a second output terminal coupled to node 424. The peak detector circuit (432) includes a first input terminal coupled to node 423, a second input terminal coupled to node 424, a first output terminal coupled to node 425, and a second output terminal coupled to node 426. The comparator circuit (433) includes a non-inverting input terminal coupled to node 425, an inverting input terminal coupled to node 426, and an output terminal coupled top node 427.

An input signal is applied across nodes 421 and 422 as a signal detector input. The bandpass filter circuit (431) is arranged to pass a limited band of the frequency spectrum associated with the input signal, which is then provided as an input to the peak detector circuit (432). The peak detector circuit (432) is arranged to provide an output signal across nodes 425 and 426 that indicates when a peak level above some predetermined threshold is achieved at node 423 relative to node 424. The comparator circuit (433) is arranged to evaluate the output of the peak detector circuit (432) and generate the signal detector output signal based on the difference between the voltages at nodes 425 and 426.

Example Line Driver Systems

FIGS. 5-8 are schematic diagrams illustrating example line driver systems that employ one or more line driver circuits that each includes a signal detector output arranged in accordance with at least some aspects of the present disclosure.

As illustrated in FIG. 5, line driver system 500 includes a multiplicity of input cards (521-522), a crosspoint switch circuit (523), a redundant crosspoint switch circuit (524), a multiplexer circuit (525), a cable/line driver circuit (526), a video system controller circuit (527), and a pair of coaxial transmission lines (528, 529). Input card 521 includes an input terminal coupled to node 501, and an output terminal pair coupled to nodes 505 and 506. Input card 522 includes an input terminal coupled to node 502, and an output terminal pair coupled to nodes 507 and 508. Crosspoint switch circuit 523 includes a first input terminal pair at nodes 505 and 506, a second input terminal pair at nodes 507 and 508, and an output terminal pair at nodes 509 and 510. Redundant crosspoint switch circuit 524 includes a first input terminal pair at nodes 505 and 506, a second input terminal pair at nodes 507 and 508, and an output terminal pair at nodes 511 and 512. Multiplexer circuit 525 includes a first input terminal pair at nodes 509 and 510, a second input terminal pair at nodes 511 and 512, a control terminal at node 516, and an output terminal pair at nodes 513 and 514. Cable/line driver circuit 526 includes an input terminal pair at nodes 513 and 514, a signal detection output terminal at node 515, an enable control terminal at node 519, and an output terminal pair at nodes 517 and 518. Video system control circuit 527 includes input terminals at nodes 515 and 519, and an output terminal at node 516. Node 517 is coupled to the first coaxial transmission line (528), while node 518 is coupled to the second coaxial transmission line (529). The output of the coaxial transmission lines correspond to nodes 503 and 504, respectively.

In operation, video content (i.e. video broadcast signals) are coupled to nodes 501 and 502. The first input card (521) and the second input card (522) each generate a respective pair of output signals after equalizing and otherwise processing their respective video signals from nodes 501 and 502. Although FIG. 5 illustrates two input cards (521, 522), any arbitrary number of input cards is equally applicable. The processed video signals from each input card (521, 522) are then coupled to both the crosspoint switch circuit (523) and the redundant crosspoint switch circuit (524) via nodes 505-508. The crosspoint switch circuits (523, 524) are arranged to dynamically select between different video feeds from the output of the input cards (521-522). The crosspoint switch circuit (523) can be used to select different video feed signals for each local region so that local broadcasting is custom tailored for local news, local sports, local commercials etc. The redundant crosspoint switch circuit (524) is arranged the same as the crosspoint circuit (523), and can be used as a backup to the crosspoint (523) in the event of a failure.

Although illustrated as two input cards with two different video signal feeds, any other number of video feeds is equally applicable. Each of the crosspoint switch circuits (523-524) can thus be arranged to select any number of an array of video signal feeds, where the crosspoint switch circuit in some applications includes hundreds of switching circuits to select from hundreds of different video signal feeds.

The multiplexer circuit (525) is arranged to select a video signal feed from either one of the crosspoint switches at nodes 509-512 based on the control signal (MX_CTL) that is provided at node 516, and also arranged to couple the selected video signal feed to the input lines of the cable/line driver circuit (526) at nodes 513 and 514. The cable/line driver circuit (526) is arranged with an internal signal detector circuit as previously described with respect to FIGS. 1-4. The cable driver circuit (526) drives a pair of video lines such as the depicted coaxial transmission lines (528 and 529) so that a video signal is received at nodes 503 and 504 based on the input signals at lines 513 and 514.

A parasitic coupling is observed internal to the cable driver circuit (526) as is illustrated by capacitor 530. The capacitive coupling is observed from the output lines of the cable driver at nodes 517 and 518 back to the input lines at nodes 513 and 514. In some instances a crosspoint switch circuit (523) may fail and the signal lines at nodes 513 and 514 include an invalid signal (e.g., noise). In such a situation, the signal lines at nodes 513 and 514 may receive noise from any variety of sources (e.g., parasitic coupling from the output lines, parasitic coupling from the input lines, thermal noise, etc.). The invalid signal levels are detected in the cable driver circuit (526) and provided as a detection signal (SD) that is sent to the externally located video system control circuit (527) via the signal detect output terminal at node 515. The video system controller circuit (527) can be arranged to use the detection signal (SD) to identify the faulty crosspoint condition and switch the multiplexer circuit (525) to the redundant crosspoint switch circuit (524) by asserting a multiplexer control signal (MX_CTL) at node 516. Once the redundant crosspoint switch circuit (524) is selected, the video content can again be delivered to the coaxial transmission lines (528 and 529). In other examples, the detection signal is used to enable an offset adjustment as previously described with respect to FIGS. 1 and 2.

Figure 6:
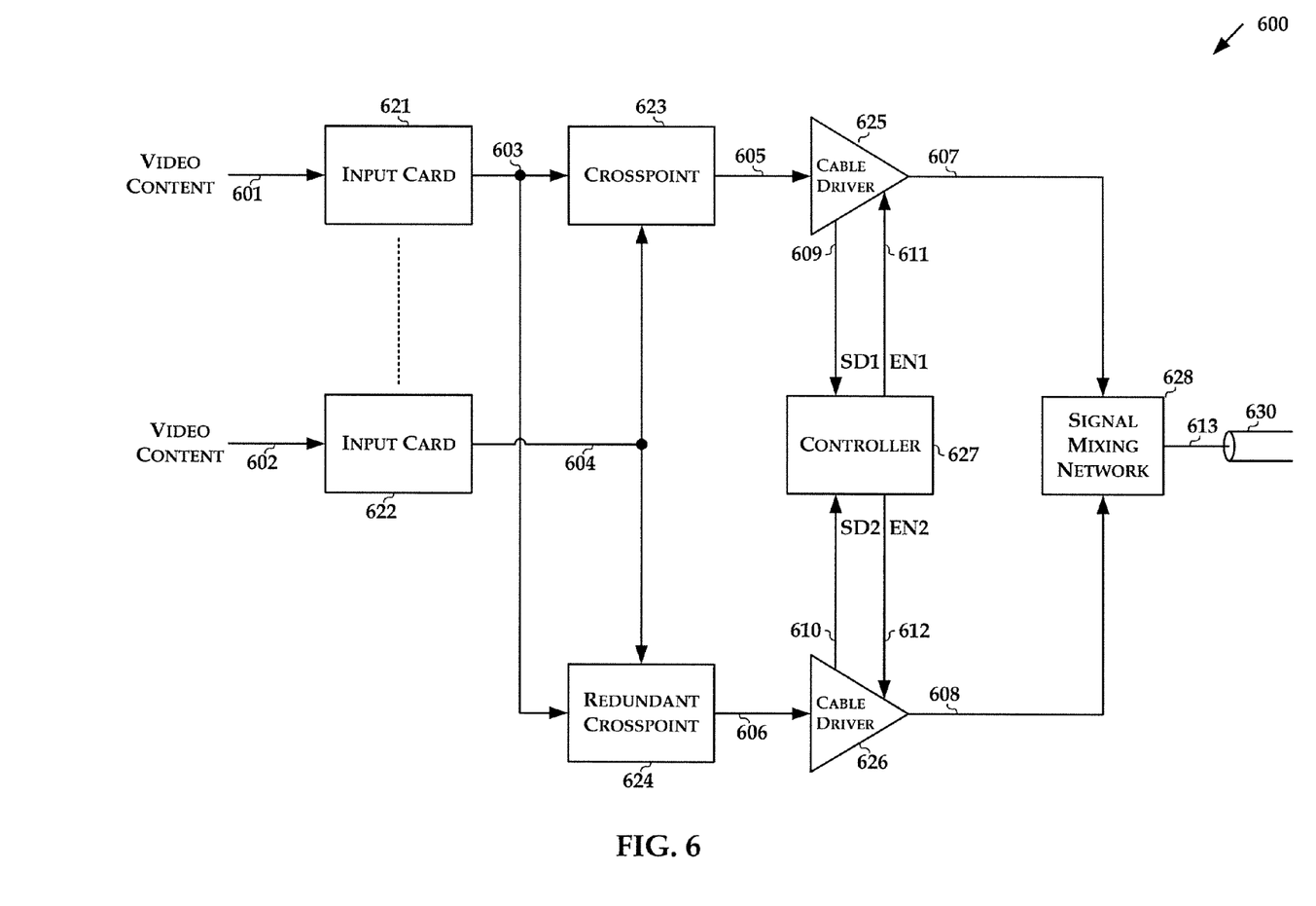
Figure 7:
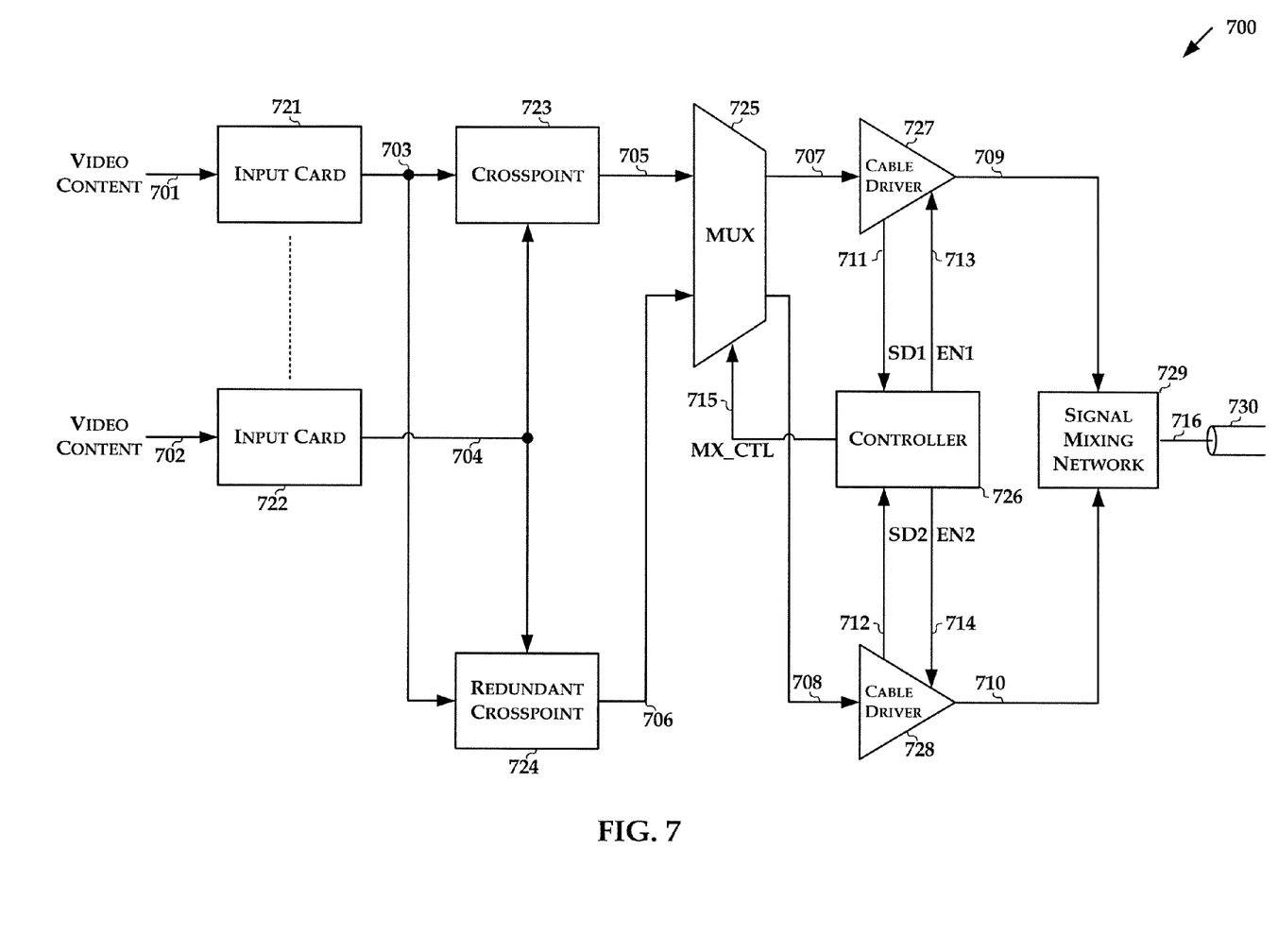
Figure 8:
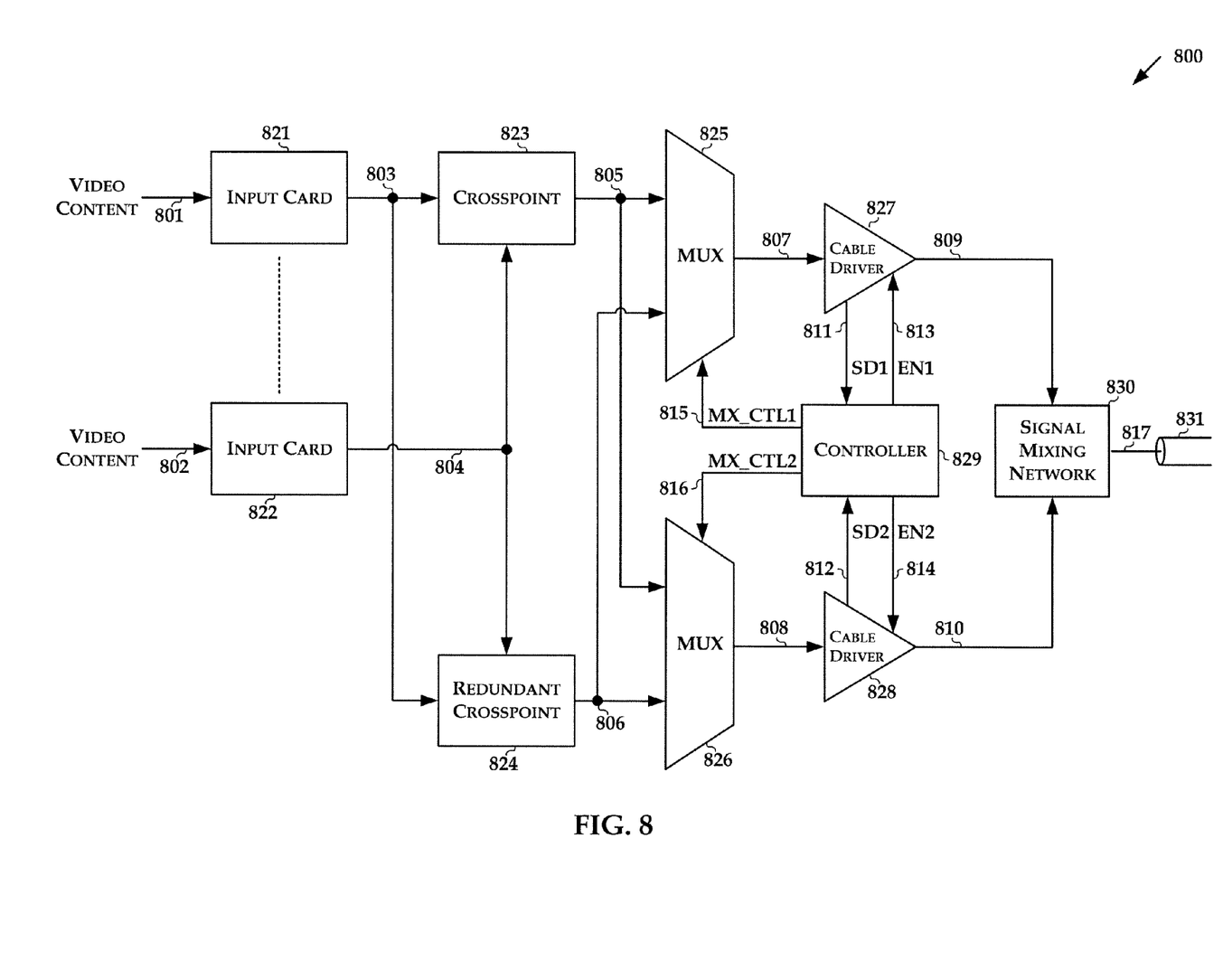

In some other examples, the detection signal (SD) is used by the video system controller circuit (527) to disable the cable/line driver circuit (526) via de-asserting (or asserting) another control signal (EN) that is coupled to an enable terminal of the cable/line driver circuit (526 via node 519. In some examples, the video system controller circuit (527) can be arranged to monitor a variety of additional control signals (not shown), so that in certain time intervals the video system controller circuit (527) determines that no video content is currently being provided through the various crosspoint switch circuits (523 and 524), and the cable/line driver circuit (526). In such an example, the cable/line driver circuit (526) may detect that no valid signal is present (e.g. SD is de-asserted) and the video system controller circuit (527) can disable the cable/line driver circuit (526) via the enable/disable control terminal at node 519 so that power is conserved and no unexpected signals are coupled to the video coaxial cables (528 and 529). The examples described-below for FIG. 6-8 illustrate other example systems, where a single input terminal or a single output terminal is utilized for each signal in the various input cards, crosspoint switches, multiplexers, signal mixing networks, and cable/line drivers. The use of single terminals is merely intended to simplify the drawings and it should be understood that these input and output terminals are intended to be differential signal lines with two wires per terminal.

As illustrated in FIG. 6, line driver system 600 includes a multiplicity of input cards (621-622), a crosspoint switch circuit (623), a redundant crosspoint switch circuit (624), two cable/line driver circuits (626 and 627), a controller circuit (627), a signal mixing network (628), and a coaxial transmission line (630). Input card 621 includes an input terminal coupled to node 601, and an output terminal coupled to node 603. Input card 622 includes an input terminal coupled to node 602, and an output terminal coupled to node 604. Crosspoint switch circuit 623 includes a first input terminal at node 603, a second input terminal at node 604, and an output terminal at node 605. Redundant crosspoint switch circuit 624 includes a first input terminal at node 603, a second input terminal at node 604, and an output terminal at node 606. Cable/line driver circuit 625 includes an input terminal at node 605, a signal detection output terminal at node 609, an enable control terminal at node 611, and an output terminal at node 607. Cable/line driver circuit 626 includes an input terminal at node 606, a signal detection output terminal at node 610, an enable control terminal at node 612, and an output terminal at node 608. Controller circuit 627 includes input terminals at nodes 609 and 619, and output terminals at nodes 611 and 612. Signal mixing network 628 includes a first input terminal at node 628, a second input terminal at node 609, and an output terminal at node 613. Node 613 is coupled to the coaxial transmission line (630).

The example system (600) of FIG. 6 is generally arranged for the same basic operation as the example system (500) illustrated in FIG. 5. However, the multiplexer circuit (525) of FIG. 5 has been eliminated and a second cable/line driver circuit (626) has been added. As shown in FIG. 6, the crosspoint switch circuit (623) is only operable with the first cable/line driver circuit (625). While the redundant crosspoint switch circuit (624) is only operable with the second cable/line driver circuit (626). During operation, a system fault (e.g., a fault in the cable/line driver or the crosspoint-switch) can be detected from one cable/line driver circuit (625) via a first SD signal (SD1) at node 609. In this example, the controller circuit (627) can disable the first cable/line driver circuit (625) by de-asserting a first enable signal (EN1), and enable the second cable/line driver circuit (626) by asserting a second enable signal (EN1).

The signal mixing network (628) can be arranged to provide both a matched terminating impedance for the coaxial transmission line (630) to prevent reflections, as well as provide signal mixing functions. Since only one of the cable line drives will typically be used at a time, the signal mixing network can be arranged as a delta-type resistor network that transmits either the signal from node 607 or node 608 to node 613.

As illustrated in FIG. 7, line driver system 700 includes a multiplicity of input cards (721-722), a crosspoint switch circuit (723), a redundant crosspoint switch circuit (724), a multiplexer circuit (725), a controller circuit (726), two cable/line driver circuits (727 and 728), a signal mixing network (728), and a coaxial transmission line (730). Input card 721 includes an input terminal coupled to node 701, and an output terminal coupled to node 703. Input card 722 includes an input terminal coupled to node 702, and an output terminal coupled to node 704. Crosspoint switch circuit 723 includes a first input terminal at node 703, a second input terminal at node 704, and an output terminal at node 705. Redundant crosspoint switch circuit 724 includes a first input terminal at node 703, a second input terminal at node 704, and an output terminal at node 706. Multiplexer circuit 725 includes a first input terminal coupled to node 705, a second input terminal coupled to node 706, a first output terminal coupled to node 707, a second output terminal coupled to node 708, and a control input terminal coupled to node 715. Controller circuit 727 includes input terminals at nodes 711 and 712, and output terminals at nodes 713-715. Cable/line driver circuit 727 includes an input terminal at node 707, a signal detection output terminal at node 711, an enable control terminal at node 713, and an output terminal at node 709. Cable/line driver circuit 728 includes an input terminal at node 708, a signal detection output terminal at node 712, an enable control terminal at node 714, and an output terminal at node 710. Signal mixing network 729 includes a first input terminal at node 709, a second input terminal at node 710, and an output terminal at node 716. Node 716 is coupled to the coaxial transmission line (730).

The example system (700) of FIG. 7 is generally arranged for the same basic operation as the example system (600) illustrated in FIG. 6. However, a multiplexer circuit (725) is interposed between the various crosspoint switch circuits (723 and 724) and the cable/line driver circuits of FIG. 5. As shown in FIG. 7, each crosspoint switch circuit (723 and 724) is operable with either of the cable/line driver circuits (727 and 728) via operation of the multiplexer circuit (725). During operation, a system fault (e.g., a fault in the cable/line driver and/or the crosspoint-switch) can be detected from one cable/line driver circuit (625) via a first SD signal (SD1) at node 711. In this example, the controller circuit (627) can either switch to a different cable line driver as described in FIG. 6, or the controller circuit (726) can change from the crosspoint switch circuit (723) to the redundant crosspoint switch circuit (724) by adjusting the control signal (MX_CTL) at node 715 for the multiplexer circuit (725).

As illustrated in FIG. 8, line driver system 800 includes a multiplicity of input cards (821-822), a crosspoint switch circuit (823), a redundant crosspoint switch circuit (824), two multiplexer circuits (825 and 826), two cable/line driver circuits (827 and 828), a controller circuit (829), a signal mixing network (830), and a coaxial transmission line (831). Input card 821 includes an input terminal coupled to node 801, and an output terminal coupled to node 803. Input card 822 includes an input terminal coupled to node 802, and an output terminal coupled to node 804. Crosspoint switch circuit 823 includes a first input terminal at node 803, a second input terminal at node 804, and an output terminal at node 805. Redundant crosspoint switch circuit 824 includes a first input terminal at node 803, a second input terminal at node 804, and an output terminal at node 806. Multiplexer circuit 825 includes a first input terminal coupled to node 805, a second input terminal coupled to node 806, an output terminal coupled to node 807, and a control input terminal coupled to node 815. Multiplexer circuit 826 includes a first input terminal coupled to node 805, a second input terminal coupled to node 806, an output terminal coupled to node 808, and a control input terminal coupled to node 816. Controller circuit 829 includes input terminals at nodes 811 and 812, and output terminals at nodes 813-816. Cable/line driver circuit 827 includes an input terminal at node 807, a signal detection output terminal at node 811, an enable control terminal at node 813, and an output terminal at node 809. Cable/line driver circuit 828 includes an input terminal at node 808, a signal detection output terminal at node 812, an enable control terminal at node 814, and an output terminal at node 810. Signal mixing network 829 includes a first input terminal at node 809, a second input terminal at node 810, and an output terminal at node 817. Node 817 is coupled to the coaxial transmission line (831).

The example system (800) of FIG. 8 is generally arranged for the same basic operation as the example system (700) illustrated in FIG. 7. However, the multiplexer circuit (725) of FIG. 7 is replaced with two multiplexer circuits (825-826), that each are operable with their own control signals (MX_CTL1 at node 815 and MX_CTL2 at node 816). As shown in FIG. 8, each crosspoint switch circuit (823 and 824) is operable with either of the cable/line driver circuits (827 and 828) via operation of the multiplexer circuits (825 and 826).

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for driving a transmission line pair with a selected one of a plurality of differential input signals, the apparatus comprising:
 a crosspoint switch circuit that includes a plurality of inputs that are arranged to receive the plurality of differential input signals, wherein the crosspoint switch circuit is arranged to couple the selected one of the plurality of differential input signals to a first pair of input terminals;
 a redundant crosspoint switch circuit that includes a plurality of inputs that are arranged to receive the plurality of differential input signals, wherein the redundant crosspoint switch circuit is arranged to couple the selected one of the plurality of differential input signals to a second pair of input terminals;
 a multiplexer circuit that is arranged to selectively couple one of the first pair of input terminals and the second pair of input terminals to a first node and a second node, respectively, in response to a multiplexer control (MX_CTL) signal;
 a line driver circuit that includes an amplifier circuit and a signal detector circuit, wherein the amplifier circuit includes a differential input terminal and a differential output terminal, wherein the differential input terminal is coupled to across the first node and the second node, and wherein the differential output terminal is coupled to the transmission line pair at a third node and a fourth node, wherein the signal detector circuit is coupled to the differential input terminal across the first node and the second node, wherein the signal detector circuit is arranged to assert a signal detection (SD) signal at a first logic level when an valid signal is identified at the differential input terminal, and wherein the signal detector circuit is arranged to assert the signal detection (SD) signal at a second logic level when an invalid signal is identified at the differential input terminal, wherein the line driver circuit is arranged such that the line driver circuit is enabled when an enable (EN) signal is asserted and disabled when the enable (EN) signal is de-asserted; and
 a controller circuit that is arranged to monitor the signal detection (SD) signal from the line driver circuit, wherein the controller circuit is externally located with respect to the line driver circuit, and wherein the controller circuit is arranged to selectively control the enable (EN) signal for the line driver circuit and the multiplexer control (MX_CTL) signal in response to the signal detection (SD) signal from the signal detector circuit.

2. The system of claim 1, wherein the signal detector circuit in the line driver circuit is at least one member of the group comprising: an energy detection circuit, a filter circuit, and a peak detector circuit.

3. The system of claim 1, wherein the signal detector circuit in the line driver circuit comprises: a linear squaring circuit and a comparator circuit, wherein the linear squaring circuit is arranged to generate an asymmetrical output signal in response to signals sensed across the first node and the second node, and wherein the comparator circuit is arranged to selectively assert the signal detection (SD) signal when the asymmetrical output signal crosses a threshold of the comparator circuit.

4. The system of claim 1, wherein the signal detector circuit comprises: a peak detector circuit and a comparator circuit, wherein the peak detector circuit is arranged to generate a peak detect output signal in response to signals sensed across the first node and the second node, and wherein the comparator circuit is arranged to selectively assert the signal detection (SD) signal when the peak detect output signal crosses a threshold of the comparator circuit.

5. The system of claim 1, wherein the amplifier circuit comprises a differential pair circuit, a differential load circuit, and a current source, wherein the differential pair circuit includes a first input terminal at the first node, a second input terminal at the second node, a first output terminal at the third node, a second output terminal at the fourth node, and a common terminal at a common node, wherein the current source is coupled to the common node, wherein the differential load circuit is coupled to the third node and the fourth node, and wherein the current source is disabled in response to the enable (EN) signal when de-asserted by the controller circuit.

6. The system of claim 1, further comprising a pull-up circuit that is coupled to the third node, and a pull-down circuit that is coupled to the fourth node, wherein the pull-up circuit and the pull-down circuit are selectively activated in response to the enable (signal) when de-asserted such that a predetermined output level is applied to the transmission lines when the line-driver circuit is disabled by the controller circuit.

7. The system of claim 1, wherein the amplifier circuit comprises an input stage amplifier and an output stage amplifier, wherein each of the input stage amplifier and the output stage amplifier comprises: wherein the input stage amplifier includes an input that is coupled across the first node and the second node, and an output that is coupled to a first intermediate node and a second intermediate node, wherein the output stage amplifier includes an input that is coupled across the first intermediate node and the second intermediate node, and an output that is coupled across the third node and the fourth node, wherein one of the input stage amplifier and the output stage amplifier is disabled in response to the enable (EN) signal when de-asserted by the controller circuit.

8. The system of claim 1, further comprising a second line driver circuit that includes a second amplifier circuit and a second signal detector circuit, wherein the amplifier circuit includes a second differential input terminal and a second differential output terminal, wherein the second differential input terminal is coupled across a fifth node and a sixth node, and wherein the differential output terminal is coupled to the transmission line pair at the third node and the fourth node, wherein the second signal detector circuit is coupled to the second differential input terminal across the fifth node and the sixth node, wherein the second signal detector circuit is arranged to assert a second signal detection (SD2) signal at the first logic level when a valid signal is identified at the second differential input terminal, and wherein the second signal detector circuit is arranged to assert the second signal detection (SDs) signal at the second logic level when an invalid signal is identified at the second differential input terminal, wherein the second line driver circuit is arranged such that the second line driver circuit is enabled when a second enable (EN2) signal is asserted and disabled when the second enable (EN2) signal is de-asserted, and wherein the multiplexer circuit that is further arranged to selectively couple one of the first pair of input terminals and the second pair of input terminals to either the first node and the second node, or the fifth node and the sixth node, respectively, in response to the multiplexer control (MX_CTL) signal.

9. The system of claim 8, further comprising a signal mixing network that is coupled between the line driver circuit and the transmission line pair, and also coupled between the second line driver circuit and the transmission line pair.

10. The system of claim 8, wherein the multiplexer circuit comprises a first multiplexer circuit and a second multiplexer circuit, wherein the first multiplexer circuit is wherein the first multiplexer circuit is arranged to selectively couple one of the first pair of input terminals to the first node and the second node, respectively, in response to a first multiplexer control signal (MX_CTL1), and wherein the second multiplexer circuit is arranged to selectively couple one of the first pair of input terminals to the fifth node and the sixth node, respectively, in response to a second multiplexer control (MX_CTL2) signal, and wherein the first multiplexer control signal (MX_CTL1) and the second multiplexer control signal (MX_CTL2) are provided by the controller circuit in response to a first signal detection signal (SD1) and the second signal detection signal (SD2).

11. A system for driving a transmission line pair with a selected one of a plurality of differential input signals, the apparatus comprising:
  a crosspoint switch circuit that includes a plurality of inputs that are arranged to receive the plurality of differential input signals, wherein the crosspoint switch circuit is arranged to couple the selected one of the plurality of differential input signals to a first pair of input terminals;
  a redundant crosspoint switch circuit that includes a plurality of inputs that are arranged to receive the plurality of differential input signals, wherein the redundant crosspoint switch circuit is arranged to couple the selected one of the plurality of differential input signals to a second pair of input terminals;
  a first line driver circuit that includes a first amplifier circuit and a first signal detector circuit, wherein the amplifier circuit includes a first differential input terminal and a first differential output terminal, wherein the first differential input terminal is coupled across the first pair of input terminals, and wherein the first differential output terminal is coupled across the transmission line pair, wherein the first signal detector circuit is coupled to the differential input terminal across the first pair of input terminals, wherein the signal detector circuit is arranged to assert a first signal detection (SD1) signal at a first logic level when a valid signal is identified at the first differential input terminal, and wherein the first signal detector circuit is arranged to assert the first signal detection (SD1) signal at a second logic level when an invalid signal is identified at the first differential input terminal, wherein the first line driver circuit is arranged such that the first line driver circuit is enabled when a first enable (EN1) signal is asserted and disabled when the first enable (EN1) signal is de-asserted;
  a second line driver circuit that includes a second amplifier circuit and a second signal detector circuit, wherein the amplifier circuit includes a second differential input terminal and a second differential output terminal, wherein the second differential input terminal is coupled across the second pair of input terminals, and wherein the second differential output terminal is coupled across the transmission line pair, wherein the second signal detector circuit is coupled to the differential input terminal across the second pair of input terminals, wherein the signal detector circuit is arranged to assert a second signal detection (SD2) signal at a first logic level when a valid signal is identified at the second differential input terminal, and wherein the second signal detector circuit is arranged to assert the second signal detection (SD2) signal at a second logic level when an invalid signal is identified at the second differential input terminal, wherein the second line driver circuit is arranged such that the second line driver circuit is enabled when a second enable (EN2) signal is asserted and disabled when the second enable (EN2) signal is de-asserted; and
  a controller circuit that is arranged to monitor the first signal detection (SD1) signal from the first line driver circuit and the second signal detection (SD2) signal from the second line driver circuit, wherein the controller circuit is externally located with respect to the line driver circuits, and wherein the controller circuit is arranged to selectively control the first enable (EN1) signal for the first line driver circuit and the second enable signal for the second line driver circuit in response to the monitored first and second signal detection (SD1 and SD2) signals.

12. The system of claim 11, wherein the signal detector circuit in each of the line driver circuits is at least one member of the group comprising: an energy detection circuit, a filter circuit, and a peak detector circuit.

13. The system of claim 11, wherein the signal detector circuits in each of the line driver circuits comprises: a linear squaring circuit and a comparator circuit, wherein the linear squaring circuit is arranged to generate an asymmetrical output signal in response to signals sensed across the either the first pair of input terminals or the second pair of input terminals, and wherein the comparator circuit is arranged to selectively assert the respective one of the signal detection (SD1, SD2) signals when the asymmetrical output signal crosses a threshold of the comparator circuit.

14. The system of claim 11, wherein the signal detector circuit in each line driver circuit comprises: a peak detector circuit and a comparator circuit, wherein the peak detector circuit is arranged to generate a peak detect output signal in response to sensed signals, and wherein the comparator circuit is selectively asserted when the peak detect output signal crosses the threshold of the comparator circuit.

15. The system of claim 11, further comprising a signal mixing network that is coupled between the first line driver circuit and the transmission line pair, and also coupled between the second line driver circuit and the transmission line pair.

* * * * *